US010319993B2

(12) United States Patent
Wang et al.

(10) Patent No.: US 10,319,993 B2
(45) Date of Patent: Jun. 11, 2019

(54) NEGATIVE ELECTRODE FOR NON-AQUEOUS ELECTROLYTE SECONDARY BATTERY

(71) Applicant: SANYO Electric Co., Ltd., Daito-shi, Osaka (JP)

(72) Inventors: Na Wang, Osaka (JP); Shinji Kasamatsu, Tokushima (JP); Yoshio Kato, Osaka (JP)

(73) Assignee: SANYO Electric Co., Ltd., Daito-shi (JP)

( * ) Notice: Subject to any disclaimer, the term of this patent is extended or adjusted under 35 U.S.C. 154(b) by 159 days.

(21) Appl. No.: 15/108,097

(22) PCT Filed: Dec. 19, 2014

(86) PCT No.: PCT/JP2014/006343
§ 371 (c)(1),
(2) Date: Jun. 24, 2016

(87) PCT Pub. No.: WO2015/098067
PCT Pub. Date: Jul. 2, 2015

(65) Prior Publication Data
US 2016/0329558 A1 Nov. 10, 2016

(30) Foreign Application Priority Data
Dec. 26, 2013 (JP) .................................. 2013-268662

(51) Int. Cl.
*H01M 4/36* (2006.01)
*H01M 4/48* (2010.01)
(Continued)

(52) U.S. Cl.
CPC .......... *H01M 4/364* (2013.01); *H01M 4/133* (2013.01); *H01M 4/134* (2013.01); *H01M 4/366* (2013.01);
(Continued)

(58) Field of Classification Search
None
See application file for complete search history.

(56) References Cited

U.S. PATENT DOCUMENTS

2007/0059600 A1  3/2007  Kim et al.
2012/0321948 A1  12/2012  Oya et al.
(Continued)

FOREIGN PATENT DOCUMENTS

JP   8-306391 A    11/1996
JP   2003-168429 A  6/2003
(Continued)

OTHER PUBLICATIONS

International Search Report dated Mar. 10, 2015, issued in counterpart International Application No. PCT/JP2014/006343 (2 pages).
(Continued)

*Primary Examiner* — Daniel S Gatewood
(74) *Attorney, Agent, or Firm* — Westerman, Hattori, Daniels & Adrian, LLP

(57) ABSTRACT

Gas evolution during the high-temperature storage of a non-aqueous electrolyte secondary battery is suppressed to improve the high-temperature storage characteristics of the non-aqueous electrolyte secondary battery. A negative electrode for a non-aqueous electrolyte secondary battery contains silicon-containing particles and graphite particles. A covering layer is disposed on each of the graphite particles. The covering layer contains a first covering material and a second covering material, the first covering material containing particles that can be made to swell with a non-aqueous electrolytic solution, the second covering material containing a water-soluble polymer material. The first covering material is disposed on a surface of each of the graphite particles. The mass ratio of the second covering material to the first covering material is higher than 1.

7 Claims, 1 Drawing Sheet

(51) Int. Cl.
  *H01M 4/58* (2010.01)
  *H01M 4/583* (2010.01)
  *H01M 4/587* (2010.01)
  *H01M 10/056* (2010.01)
  *H01M 10/0525* (2010.01)
  *H01M 4/134* (2010.01)
  *H01M 4/62* (2006.01)
  *H01M 4/38* (2006.01)
  *H01M 4/133* (2010.01)
  *H01M 4/02* (2006.01)

(52) U.S. Cl.
  CPC .......... *H01M 4/386* (2013.01); *H01M 4/483* (2013.01); *H01M 4/583* (2013.01); *H01M 4/587* (2013.01); *H01M 4/62* (2013.01); *H01M 4/622* (2013.01); *H01M 10/056* (2013.01); *H01M 10/0525* (2013.01); *H01M 2004/027* (2013.01); *H01M 2300/002* (2013.01)

(56) References Cited

U.S. PATENT DOCUMENTS

2013/0004855 A1* 1/2013 Yamazaki ............. H01M 4/133
                                                        429/233
2013/0302701 A1    11/2013 Deguchi
2014/0127576 A1*   5/2014 Kato ..................... H01M 4/131
                                                        429/213

FOREIGN PATENT DOCUMENTS

| JP | 2007-80827 A | 3/2007 | | |
|----|---|---|---|---|
| JP | 2011-113862 A | 6/2011 | | |
| JP | 2011-138680 A | 7/2011 | | |
| JP | 2013-12394 A | 1/2013 | | |
| JP | 2013012394 A | * | 1/2013 | |
| JP | 2013-45524 A | 3/2013 | | |
| JP | 5204929 B1 | 6/2013 | | |
| WO | 2011/105126 A1 | 9/2011 | | |
| WO | 2013/018486 A1 | 2/2013 | | |
| WO | WO-2013018486 A1 | * | 2/2013 | ............ H01M 4/131 |

OTHER PUBLICATIONS

English translation of Office Action dated Nov. 27, 2017, issued in counterpart Chinese Application No. 201480071073.8 (2 pages).

* cited by examiner

NEGATIVE ELECTRODE FOR NON-AQUEOUS ELECTROLYTE SECONDARY BATTERY

TECHNICAL FIELD

The present invention relates to negative electrodes for non-aqueous electrolyte secondary batteries.

BACKGROUND ART

In order to increase the energy density and power of lithium-ion batteries, metallic materials that can form alloys with lithium, such as silicon, germanium, tin, and zinc, and oxides of these metals have been studied as negative electrode active materials, instead of carbonaceous materials, such as graphite.

It is known that negative electrode active materials composed of metallic materials that can form alloys with lithium and oxides of these metals expand or contract during charging and discharging and therefore have poor cycling characteristics. Patent Literature 1 describes a non-aqueous electrolyte secondary battery that includes a silicon powder as a negative electrode active material and an elastic binder coating layer disposed on the surface of the silicon powder to reduce the influence of expansion and contraction of the negative electrode active material.

CITATION LIST

Patent Literature

PTL 1: Japanese Published Unexamined Patent Application No. 2007-80827

SUMMARY OF INVENTION

Technical Problem

Although the non-aqueous electrolyte secondary battery described in Patent Literature 1 has improved cycling characteristics, there is a problem of gas evolution during high-temperature storage.

Solution to Problem

To solve the problems described above, a negative electrode for a non-aqueous electrolyte secondary battery according to the present invention is a negative electrode for a non-aqueous electrolyte secondary battery containing silicon-containing particles and graphite particles. A covering layer is disposed on each of the graphite particles. The covering layer contains a first covering material and a second covering material, the first covering material containing particles that can be made to swell with a non-aqueous electrolytic solution, the second covering material containing a water-soluble polymer material. The first covering material is disposed on a surface of each of the graphite particles. The mass ratio of the second covering material to the first covering material is higher than 1.

Advantageous Effects of Invention

A non-aqueous electrolyte secondary battery that includes a negative electrode for a non-aqueous electrolyte secondary battery according to the present invention can reduce gas evolution during high-temperature storage of the non-aqueous electrolyte secondary battery and has improved high-temperature storage characteristics.

DESCRIPTION OF EMBODIMENTS

Figure 1:
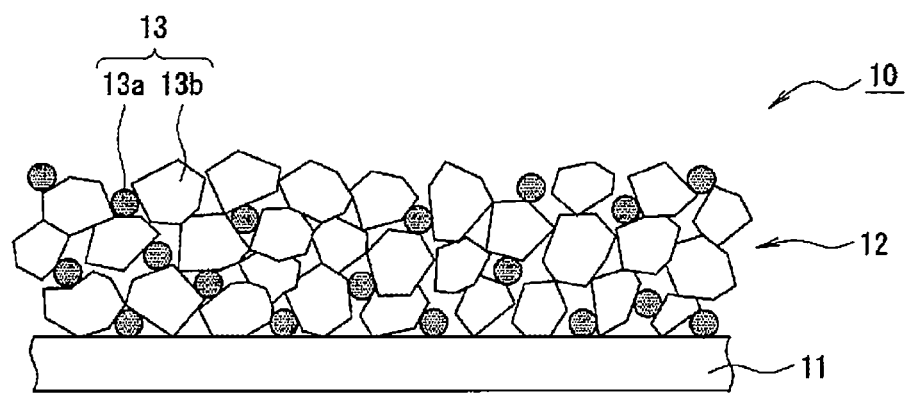
FIG. 1 is a cross-sectional view of a negative electrode according to an embodiment of the present invention.

Embodiments of the present invention will be described in detail below.

The drawings referred in the embodiments are schematically illustrated, and the dimensions of constituents in the drawings may be different from the actual dimensions of the constituents. Specific dimensions should be determined in consideration of the following description.

A non-aqueous electrolyte secondary battery according to an embodiment of the present invention includes a positive electrode containing a positive electrode active material, a negative electrode containing a negative electrode active material, a non-aqueous electrolyte containing a non-aqueous solvent, and a separator. A non-aqueous electrolyte secondary battery according to an embodiment includes an electrode assembly and a non-aqueous electrolyte in a housing. The electrode assembly includes a roll of a positive electrode and a negative electrode with a separator interposed therebetween.

[Positive Electrode]

A positive electrode preferably includes a positive electrode current collector and a positive electrode active material layer disposed on the positive electrode current collector. The positive electrode current collector may be an electrically conductive thin film, particularly a foil of a metal that is stable in an electric potential range of the positive electrode, such as aluminum, a foil of an alloy of the metal, or a film having a surface layer of a metal such as aluminum. The positive electrode active material layer preferably contains an electrically conductive material and a binder as well as a positive electrode active material.

The positive electrode active material contains an oxide containing lithium and a metal element M. The metal element M contains at least one selected from the group consisting of cobalt and nickel. The positive electrode active material is preferably a lithium transition metal oxide. The lithium transition metal oxide may contain a non-transition metal element, such as Mg or Al. More specifically, the lithium transition metal oxide may be lithium cobalt oxide, Ni—Co—Mn, Ni—Mn—Al, or Ni—Co—Al. The positive electrode active materials may be used alone or in combination.

[Negative Electrode]

As illustrated in FIG. 1, a negative electrode 10 preferably includes a negative electrode current collector 11 and a negative electrode active material layer 12 disposed on the negative electrode current collector 11. The negative electrode current collector 11 may be an electrically conductive thin film, particularly a foil of a metal that is stable in an electric potential range of the negative electrode, such as copper, a foil of an alloy of the metal, or a film having a surface layer of a metal such as copper.

As illustrated in FIG. 1, a negative electrode active material 13 includes a negative electrode active material 13a, which is a silicon-containing particle, and a negative electrode active material 13b, which is a graphite-containing particle. The negative electrode active material 13a preferably contains $SiO_x$, Si, or a Si alloy. The Si alloy may be a solid solution of silicon and at least one element other than silicon, an intermetallic compound of silicon and at least one element other than silicon, or an eutectic alloy of silicon and at least one element other than silicon. The alloy may be formed by an arc melting method, a melt-quenching method, a mechanical alloying method, a sputtering method, a chemical vapor deposition method, or a firing method. In particular, the melt-quenching method may be a single-roll quenching method, a twin-roll quenching method, or an atomizing method, such as a gas atomizing method, a water atomizing method, or a disk atomizing method.

A $SiO_x$ particle preferably has an electrically conductive covering layer covering at least part of its surface. The covering layer is an electrically conductive layer formed of a material having a higher electrical conductivity than $SiO_x$. The electrically conductive material of the covering layer is preferably electrochemically stable and is preferably at least one selected from the group consisting of carbon materials, metals, and metallic compounds.

Figure 2:
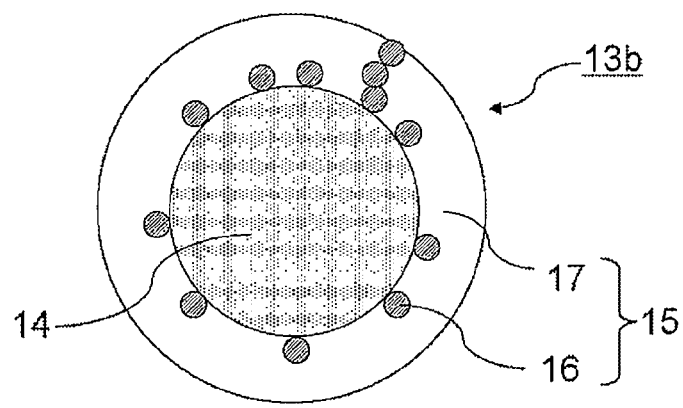
FIG. 2 is a cross-sectional view of a negative electrode active material particle according to an embodiment of the present invention.

As illustrated in FIG. 2, the negative electrode active material 13b includes a covering layer 15 on a graphite particle 14. The covering layer 15 includes a first covering material 16 on the graphite particle 14, and a second covering material 17 covering the first covering material 16. The first covering material 16 is a particle that can be made to swell with a non-aqueous electrolytic solution, and the second covering material 17 is a water-soluble polymer material.

In a non-aqueous electrolyte secondary battery that includes a negative electrode containing the negative electrode active material 13a and the negative electrode active material 13b, the second covering material 17 can reduce expansion of the negative electrode active material 13a associated with charging and discharging. Furthermore, when the covering layer 15 of the negative electrode active material 13b has a crack during high-temperature storage, and the negative electrode active material 13b has a fresh active material surface, that is, when the graphite particle 14 is exposed to a non-aqueous electrolytic solution, the first covering material 16 on the graphite particle 14 is made to swell with the electrolytic solution and reduces supply of the electrolytic solution to the fresh active material surface, thereby suppressing a reaction between the electrolytic solution and the fresh active material surface and reducing gas evolution.

The mass ratio of the second covering material 17 to the first covering material 16 is preferably higher than 1. In other words, in the negative electrode mixture, the mass of the second covering material 17 is preferably greater than the mass of the first covering material 16. If the mass of the first covering material 16 is greater than the mass of the second covering material 17 in the negative electrode mixture, the first covering material tends to increase the electrical resistance of the negative electrode, which results in a characteristic degradation of the battery. The mass ratio of the second covering material 17 to the first covering material 16 is preferably 10 or less.

In the first covering material 16, the particles that can be made to swell with a non-aqueous electrolytic solution may be formed of at least one selected from the group consisting of styrene-butadiene rubber (SBR), acrylonitrile-butadiene rubber (NBR), butadiene rubber, isoprene rubber, polysulfide rubber, chloroprene rubber, polyurethane rubber, silicon rubber, ethylene propylene diene methylene (EPDM), acrylic rubber, and fluorinated viscoelastic substances. Among these, styrene-butadiene rubber (SBR) is preferred.

In the second covering material 17, the water-soluble polymer material may be at least one selected from the group consisting of carboxymethyl cellulose (CMC), polystyrene glycols, celluloses, poly-N-vinylamides, poly(acrylic acid)s, and polyacrylamides. Among these, carboxymethyl cellulose is preferred because of its good binding property for both the graphite active material and the silicon active material.

The coverage of the graphite particle 14 with the first covering material ranges from 0.1% to 50%, preferably 1% to 40%, more preferably 10% to 20%. A coverage of less than 0.1% results in increased reactivity between the electrolytic solution and the fresh active material surface during high-temperature storage, thus resulting in an increased amount of gas evolution. A coverage of more than 50% tends to result in an increased electrical resistance of the covering layer 15 and an increased electrical resistance of the battery, thus resulting in a characteristic degradation of the battery.

The mass of the first covering material 16 preferably ranges from 0.1% to 5% of the mass of the graphite particle 14. When the mass ratio is less than 0.1%, the reaction between the electrolytic solution and the fresh active material surface cannot be controlled, and gas evolution during high-temperature storage tends to increase. When the mass ratio is more than 5%, the covering layer 15 tends to have an increased electrical resistance, and the battery tends to suffer a characteristic degradation due to the increased electrical resistance.

The second covering material 17 preferably entirely covers the graphite particle 14. The mass of the second covering material 17 preferably ranges from 1% to 5%, more preferably 1.2% to 3%, of the graphite particle 14. When the mass ratio is less than 1%, the binding strength between active material particles tends to decrease, and the capacity tends to decrease due to expansion of the negative electrode active material 13, particularly the negative electrode active material 13a, associated with cycling. When the mass ratio is more than 5%, the negative electrode tends to have an increased electrical resistance, and the battery tends to have a decreased capacity.

The covering layer 15 has an average thickness in the range of 10 to 800 nm, preferably 100 to 400 nm. When the second covering material 17 entirely covers the graphite particle 14 and the first covering material, the thickness of the covering layer 15 corresponds to the thickness between the surface of the graphite particle 14 and the outermost surface of the covering layer 15. The first covering material 16 may be stacked on the graphite particle 14 and may protrude from the outermost surface of the second covering material 17. In such a case, the thickness of the covering layer 15 includes the protrusion of the first covering material 16. When the covering layer 15 has an average thickness of less than 10 nm, this tends to result in insufficient adhesion between the negative electrode active material 13b and the negative electrode active material 13b or between the negative electrode active material 13a and the negative electrode active material 13b. When the covering layer 15 has an average thickness of more than 800 nm, this tends to result in an increased electrical resistance of the covering layer 15 and an increased electrical resistance of the battery, thus resulting in a characteristic degradation of the battery.

The negative electrode active material 13b, which includes the first covering material 16 disposed on the graphite particle 14 and the second covering material 17 covering the first covering material 16, may be produced by applying the first covering material 16 to the graphite particle 14, drying the first covering material 16, and mixing the second covering material 17 with the graphite particle 14 on which the first covering material 16 is disposed.

The mass ratio of the negative electrode active material 13a to the negative electrode active material 13b ranges from 1:99 to 20:80, preferably 3:95 to 10:90. When the mass of the negative electrode active material 13a is less than 1% of the total mass of the negative electrode active materials, the capacity tends to be insufficiently improved. When the mass of the silicon-containing particles is more than 20% of the total mass of the negative electrode active materials, the capacity tends to be decreased due to expansion of the silicon active material.

[Non-Aqueous Electrolyte]

The non-aqueous electrolyte contains an electrolyte salt, for example, $LiClO_4$, $LiBF_4$, $LiPF_6$, $LiAlCl_4$, $LiSbF_6$, LiSCN, $LiCF_3SO_3$, $LiCF_3CO_2$, $LiAsF_6$, $LiB_{10}Cl_{10}$, lower aliphatic Lithium carboxylate, LiCl, LiBr, Lii, chloroborane lithium, a borate, or an imide salt. Among these, $LiPF_6$ is preferred in terms of ionic conductivity and electrochemical stability. These electrolyte salts may be used alone or in combination. The electrolyte salt content preferably ranges from 0.8 to 1.5 mol per liter of the non-aqueous electrolyte.

The solvent for the non-aqueous electrolyte may be a cyclic carbonate, linear carbonate, or cyclic carboxylate. The cyclic carbonate may be propylene carbonate (PC), ethylene carbonate (EC), or fluoroethylene carbonate (FEC). The linear carbonate may be diethyl carbonate (DEC), ethyl methyl carbonate (EMC), or dimethyl carbonate (DMC). The cyclic carboxylate may be γ-butyrolactone (GBL) or γ-valerolactone (GVL). A chain carboxylate may be methyl propionate (MP) or fluoromethyl propionate (FMP). These non-aqueous solvents may be used alone or in combination.

[Separator]

The separator may be an ion-permeable insulating porous sheet. Specific examples of the porous sheet include microporous thin films, woven fabrics, and nonwoven fabrics. The material of the separator is preferably a polyolefin, such as polyethylene or polypropylene.

EXAMPLES

Although the present invention will be further described in the following examples, the present invention is not limited to these examples.

First Example

Experiment 1

(Preparation of Positive Electrode)

Lithium cobalt oxide, acetylene black (HS100 manufactured by Denki Kagaku Kogyo K.K.), and poly(vinylidene fluoride) (PVdF) were weighed and mixed at a mass ratio of 95.0:2.5:2.5. A dispersion medium N-methyl-2-pyrrolidone (NMP) was added to the mixture. The mixture was stirred in a mixer (T.K. Hivis Mix manufactured by Primix Corporation) to prepare a positive electrode slurry. The positive electrode slurry was applied to each surface of a positive electrode current collector formed of aluminum foil, was dried, and was rolled with a roller, thus forming a positive electrode having a positive electrode mixture layer on each surface of the positive electrode current collector. The positive electrode mixture layer had a packing density of 3.60 g/ml.

(Preparation of Negative Electrode)

Graphite (average primary particle size: 20 μm, BET specific surface area: 3.5 m²/g) and a styrene-butadiene rubber (SBR) were mixed at a mass ratio of 99.5:0.5. Water was added to the mixture as a diluent solvent until the solid content of the mixture reached 50% by mass. The mixture was kneaded in a mixer (T.K. Hivis Mix manufactured by Primix Corporation) at an agitation speed of 40 rpm for 60 minutes and was dried under vacuum, thus forming a graphite powder covered with the SBR.

The coverage of a graphite powder with SBR was calculated by the following method. SBR was stained with an electron staining agent osmium tetroxide (OsO4). A cross section of a graphite active material was exposed by a cross-section polisher method and was scanned with a scanning electron microscope (JSM-6500F manufactured by JEOL Ltd., accelerating voltage: approximately 5 kV). Graphite particles and SBR were identified in a SEM image and its backscattered electron image on the basis of their contrasts. The percentage of a portion of the circumference of a graphite particle covered with SBR in the cross section was calculated as the coverage of the graphite particle with the SBR. Thirty graphite particles were randomly selected in a 600 μm×450 μm area of a SEM image. The coverages of the 30 graphite particles with SBR were averaged to determine SBR coverage. Table 1 shows the results.

$SiO_x$ covered with carbon (x=0.93, average primary particle size: 6.0 μm) and graphite covered with SBR were mixed at a mass ratio of 10:90 to prepare a negative electrode active material. Water was added as a diluent solvent to the negative electrode active material and sodium carboxymethyl cellulose (CMC) until the solid content reached 60% by mass. The mixture was stirred in a mixer (T.K. Hivis Mix manufactured by Primix Corporation) at 40 rpm for 60 minutes (first kneading). Water was added to the mixed solution while stirring to prepare a negative electrode slurry having a viscosity of 1 Pa·s. The mass ratio of the negative electrode active material to CMC in the negative electrode slurry was adjusted to be 97:3.

[Preparation of Non-Aqueous Electrolytic Solution]

A non-aqueous electrolytic solution was prepared by adding 1.0 mol/liter of lithium hexafluorophosphate ($LiPF_6$) to a 3:7 (vol/vol) mixed solvent of ethylene carbonate (EC) and diethyl carbonate (DEC).

[Fabrication of Battery]

A tab was attached to each of the electrodes. The positive electrode and the negative electrode were wound with the separator interposed therebetween such that the tabs were located on the outermost periphery, thus forming a wound electrode assembly. The electrode assembly was inserted into a housing formed of an aluminum laminate sheet and was dried under vacuum at 105° C. for 2 hours. The non-aqueous electrolytic solution was then injected into the housing, and the opening of the housing was sealed. Thus, a battery A1 was fabricated. The design capacity of the battery A1 is 800 mAh.

Experiment 2

A battery A2 was fabricated in the same manner as in the battery A1 except that the graphite and SBR were mixed at a mass ratio of 99.0:1.0 to cover the graphite with the SBR in the formation of the negative electrode.

Experiment 3

A battery A3 was fabricated in the same manner as in the battery A1 except that the graphite and SBR were mixed at a mass ratio of 98.0:2.0 to cover the graphite with the SBR in the formation of the negative electrode.

Experiment 4

A battery R1 was fabricated in the same manner as in the battery A1 except that graphite particles were not precoated with SBR in the formation of the negative electrode.

Experiment 5

A battery R2 was fabricated in the same manner as in the battery A1 except that, in the formation of the negative electrode, graphite particles were not precoated with SBR, after the first kneading water was added while stirring until the viscosity reached 1 Pa·s, and then SBR was added and stirred for 30 minutes, thus preparing a negative electrode slurry containing the negative electrode active material: CMC:SBR=96:3:1 on a mass basis.

Experiment 6

A battery R3 was fabricated in the same manner as in the battery A1 except that, in the formation of the negative electrode, graphite particles were not precoated with SBR, after the first kneading water was added while stirring until the viscosity reached 1 Pa·s, and then SBR was added and stirred for 30 minutes, thus preparing a negative electrode slurry containing the negative electrode active material: CMC:SBR=94:3:3 on a mass basis.

Experiment 7

A battery R4 was fabricated in the same manner as in the battery A1 except that, in the formation of the negative electrode, graphite particles were not precoated with SBR, after the first kneading water was added while stirring until the viscosity reached 1 Pa·s, and then SBR was added and stirred for 30 minutes, thus preparing a negative electrode slurry containing the negative electrode active material: CMC:SBR=92:3:5 on a mass basis.

Experiment 8

A battery R5 was fabricated in the same manner as in the battery A1 except that, in the formation of the negative electrode, graphite particles were not precoated with SBR, and the mass ratio of the negative electrode active material: CMC was adjusted to be 95:5.

(Measurement of Thickness of Covering Layer on Graphite Surface)

The thickness of the covering layer on graphite was calculated for each of the negative electrodes as described below. SBR and CMC were differently stained with two types of electron staining agents. A cross section of the negative electrode active material layer was exposed by a cross-section polisher method and was scanned with a scanning electron microscope (JSM-6500F manufactured by JEOL Ltd., accelerating voltage: approximately 5 kV). The negative electrode active material, SBR, and CMC were identified in a SEM image and its backscattered electron image on the basis of their contrasts. In a SEM image, 10 graphite particles were randomly selected, and the thickness of the covering layer containing SBR and CMC on each of the graphite particles was measured and was averaged to determine the covering layer thickness. Table 1 shows the results. To differently stain SBR and CMC, SBR was stained with an electron staining agent osmium tetroxide ($OsO_4$), and then CMC was stained with another electron staining agent ruthenium tetroxide ($RuO_4$).

In the negative electrodes of Experiments 4 to 8, SBR was dispersed in a layer containing SBR and CMC, and little SBR was in contact with graphite particles. In the negative electrodes of Experiments 1 to 3, some SBR was in contact with graphite particles even after the negative electrode was formed.

(Experiments)

The batteries A1 to A3 and R1 to R5 were checked for gas evolution after storage.

[Charging and Discharging Conditions]

Constant-current charging to a battery voltage of 4.2 V at an electric current of 1.0 it (800 mA) was followed by constant-voltage charging to a current value of 0.05 it (40 mA) at a voltage of 4.2 V. After suspension for 10 minutes, constant-current discharging was performed at an electric current of 1.0 it (800 mA) to a battery voltage of 2.75 V.

After initial charging and discharging, the battery was subjected to constant-current charging to a battery voltage of 4.2 V at an electric current of 1.0 it (800 mA) followed by constant-voltage charging to a current value of 0.05 it (40 mA) at a voltage of 4.2 V, and was stored at 80° C. for 4 days.

Table 1 shows the amount of gas evolved from the battery measured after storage. The amount of gas evolution was measured by a buoyancy method. More specifically, the difference between the mass of the battery in water before storage and the mass of the battery in water after the storage was considered to be the amount of evolved gas during storage. The main component of the evolved gas was an oxidation gas.

TABLE 1

| Battery | Amount of SBR precoat on graphite particles (mass %) | Coverage of graphite with SBR (%) | Amount of CMC added in preparation of negative electrode slurry (mass %) | Amount of SBR added in preparation of negative electrode slurry (mass %) | Thickness of covering layer (nm) | Gas evolution (mL) |
|---|---|---|---|---|---|---|
| A1 | 0.5 | 10 | 3 | None | 100 | 2.1 |
| A2 | 1 | 20 | 3 | None | 200 | 1.3 |
| A3 | 2 | 40 | 3 | None | 400 | 0.6 |
| R1 | No precoat | No coverage | 3 | None | 50 | 3.4 |
| R2 | No precoat | No coverage | 3 | 1 | 250 | 4.6 |
| R3 | No precoat | No coverage | 3 | 3 | 500 | 6.9 |
| R4 | No precoat | No coverage | 3 | 5 | 800 | 9.1 |
| R5 | No precoat | No coverage | 5 | None | 90 | 6.1 |

A comparison between the batteries R1 and R5 shows that the amount of gas evolved during storage increases with increasing amount of CMC in the negative electrode mixture. A comparison between the batteries R1 to R4 shows that the amount of gas evolved during storage also increases with increasing amount of SBR in the negative electrode mixture.

In the batteries R1 to R5, no SBR is present on each graphite particle, but a layer containing CMC, which has high binding strength and low elastic force, is present on each graphite particle, and SBR is present on or in the CMC layer. Thus, during high-temperature storage, when expansion of $SiO_x$ causes a crack in the CMC layer on the graphite particles, a fresh surface of the graphite particles reacts directly with the electrolytic solution to evolve gas.

In the batteries A1 to A3, a layer containing CMC is present on each graphite particle covered with SBR. Thus, during high-temperature storage, even when expansion of $SiO_x$ causes a crack in the CMC layer on the graphite particles, SBR, which can be made to swell with an electrolytic solution, can suppress a direct reaction between a fresh surface of the graphite particles and the electrolytic solution, thereby reducing the amount of evolved gas.

REFERENCE SIGNS LIST

10 negative electrode, 11 negative electrode current collector, 12 negative electrode active material layer, 13, 13a, 13b negative electrode active material, 14 graphite particle, 15 covering layer, 16 first covering material, 17 second covering material

The invention claimed is:

1. A negative electrode for a non-aqueous electrolyte secondary battery, the negative electrode comprising silicon-containing particles and graphite particles,
   wherein a covering layer is disposed on each of the graphite particles,
   the covering layer contains a first covering material and a second covering material, the first covering material containing particles that can be made to swell with a non-aqueous electrolytic solution, the second covering material containing a water-soluble polymer material,
   the first covering material is disposed on a surface of each of the graphite particles,
   a mass ratio of the second covering material to the first covering material in a negative electrode mixture is higher than 1,
   wherein coverage of the graphite particles with the first covering material ranges from 10% to 50%, and
   wherein the second covering material is disposed on a surface of the first covering material.

2. The negative electrode for a non-aqueous electrolyte secondary battery according to claim 1, wherein a mass of the first covering material ranges from 0.1% to 5% of a mass of each of the graphite particles.

3. The negative electrode for a non-aqueous electrolyte secondary battery according to claim 1, wherein the covering layer has an average thickness in the range of 10 to 800 nm.

4. The negative electrode for a non-aqueous electrolyte secondary battery according to claim 1, wherein the first covering material contains a styrene-butadiene rubber, and the second covering material contains carboxymethyl cellulose.

5. The negative electrode for a non-aqueous electrolyte secondary battery according to claim 1, wherein a mass ratio of the silicon-containing particles to the graphite particles ranges from 1:99 to 20:80.

6. The negative electrode for a non-aqueous electrolyte secondary battery according to claim 1, wherein a mass of the second covering material ranges from 1% to 5% of a mass of each of the graphite particles.

7. The negative electrode for a non-aqueous electrolyte secondary battery according to claim 1, wherein that the covering layer has a thickness in the range of 10 to 400 nm.

* * * * *